Patented Nov. 21, 1950

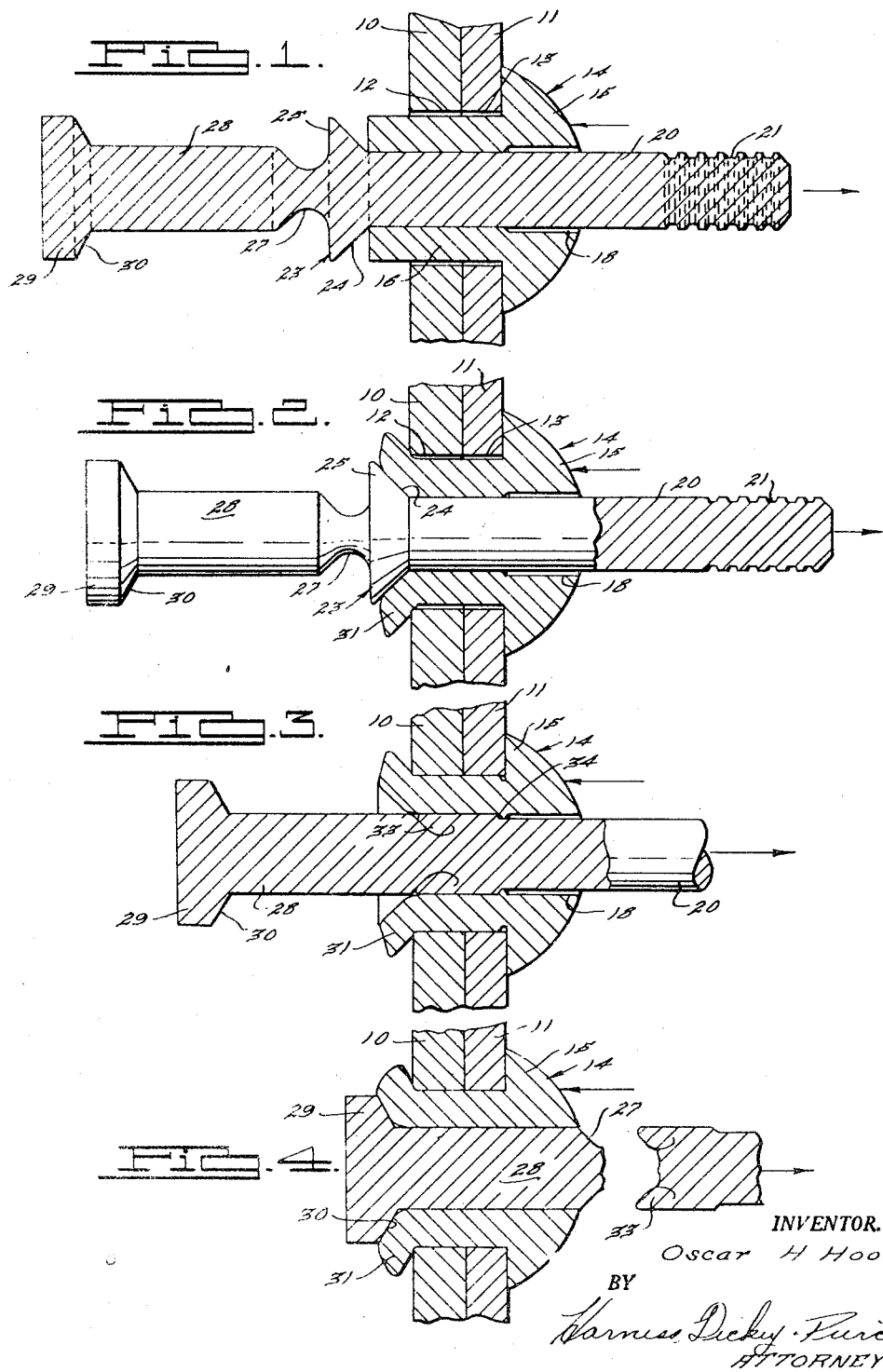

2,531,270

UNITED STATES PATENT OFFICE 2,531,270

BLIND RIVET

Oscar H. Hood, Detroit, Mich., assignor to Huck Manufacturing Company, a corporation of Michigan Application October 22, 1947, Serial No. 781,425

1 Claim. (Cl. 85—40)

The invention relates to fastening devices and it has particular relation to a rivet and method of riveting.

The type of rivet to which the present invention relates is known as a blind rivet and includes a tubular element adapted to extend through openings in a structure to be riveted, and a pin extending through the tubular element. That end of the pin opposite the blind end of the rivet is pulled during the riveting operation and the adjacent end of the tubular element is held against movement so that the pin is moved relative to the tubular element. In a so-called "tulip" head type of blind rivet, the blind end of the tubular element is expanded by a portion of the pin when the later is pulled so as to form a tulip head at the blind side of the structure. During the riveting operation, it is desirable that the opening in the structure be filled through expansion of the tubular element and also desirable that the structural parts being riveted, be drawn tightly and strongly together. In this connection, it is important that the structural parts be drawn tightly together before the opening is filled by expansion of the tubular element for the reason that if the expansion occurred first it would be practically impossible to then draw the structural parts tightly together and this would be particularly true if the expanding metal moved out slightly between the structural parts.

The present invention is designed to accomplish the results stated above as being desirable by employing a shoulder on the pin which acts first to upset the blind end of the tubular element and form a head at the blind side of the structure. Movement of the pin and shoulder not only causes the forming of the blind head but also through this head acts to draw the structural parts tightly together. After the blind head is formed and the structural parts are drawn tightly together, the resistance to movement of the shoulder through the tubular element results in its being bent and drawn axially to a smaller size and in order to allow this action, the pin next to the shoulder has an annular recess for receiving the shoulder metal. Continued movement of the pin through the tubular element then expands it to fill the opening. Movement of the pin is limited by a head on the pin engaging the blind head on the tubular element and thereafter the pin breaks under tension at the annular recess mentioned.

One object of the invention, therefore, is to provide a rivet of the type mentioned having improved means for first forming a blind head on the tubular element and drawing the structural parts tightly together and thereafter filling the opening in such parts so as to obtain a tight rivet.

Another object of the invention is to provide a rivet of this character wherein a shoulder for initially forming the blind head, is subsequently drawn into a recess in the pin so as to allow the pin to continue its movement through the tubular element without undesirable resistance.

Other objects of the invention will become apparent from the following specification, from the drawings relating thereto and from the claim hereinafter set forth.

For a better understanding of the invention reference may be had to the drawings wherein:

Figure 1 is a cross-sectional view illustrating a rivet constructed according to one form of the invention.

Fig. 2 is a similar view showing the rivet after the shoulder on the pin has formed the blind head.

Fig. 3 is a similar view showing the shoulder bent and drawn into the recess in the pin and the opening substantially filled by expansion of the tubular element.

Fig. 4 is a view of the rivet after it has been set and the pin broken under tension.

Referring to Fig. 1, a pair of plates are illustrated at 10 and 11 and these have openings 12 and 13 for receiving a rivet. The rivet includes a tubular element 14 having a head 15 for engaging the plate 11, and a cylindrical body 16 adapted to project through the openings 12 and 13. That portion of the tubular body inwardly from the head 15 is shown and may be substantially uniform in radial thickness but it will be noted that the opening in the head is slightly enlarged by counterboring as indicated at 18.

The second part of the rivet comprises a pin 20 extending through the tubular element and having a portion projecting from the head 15 and provided with annular grooves 21. These grooves enable gripping of the pin by means of jaws in a riveting mechanism so that it can be pulled. This riveting mechanism includes an anvil adapted to engage the head 15 so that when the pin is pulled a reaction force is applied against the head 15 so as to hold it against the plate 11.

Beyond the blind and inner end of the tubular element, the pin has an annular shoulder 23 which is defined by a frusto-conical surface 24 next to the end of the tubular element and a substantially radial wall 25 at the opposite side of the shoulder. The maximum diameter of this shoulder substantially corresponds to the outer diameter of the cylindrical body portion of the tubular element and the frusto conical surface 24, serves to expand the projecting end of the tubular element when the pin is pulled. Next to the wall 25, the pin has an annular, relatively deep groove or recess 27 and this recess is sufficiently long in an axial direction and sufficiently deep that it will accommodate substantially the volume of metal in the shoulder 23 outwardly of a diameter substantially corresponding to the inner diameter of the cylindrical body portion of the tubular element after the latter has been expanded to fill the openings 12 and 13.

Beyond the recess 27, the pin has a portion 28 which is slightly larger in diameter than the diameter of the opening in the cylindrical body portion of the tubular element so that this portion will at least fill the expanded cylindrical body portion of the tubular element after the latter has been expanded to fill the openings 12 and 13. At the outer end of the portion 28, the pin has a head 29 and the inner side of this head is frusto conical as indicated at 30.

In setting the rivet, the pin is pulled in the direction shown by the arrow in Fig. 2 and as the shoulder 23 moves into the end of the tubular element, it expands and causes it to mushroom outwardly so as to form a head 31. The pressing of this head against the plate 10 as pulling of the pin continues, causes the plates 10 and 11 to be drawn tightly together so as to eliminate any space between the plates. When this has been accomplished, further movement of the shoulder 23 is strongly resisted and it begins to bend and draw inwardly towards the axis of the pin and to flow into the recess 27. Thus, as the pin continues its movement, the shoulder metal flows or moves into the recess 27 as illustrated in Fig. 3 at 33.

While resistance to movement of the shoulder 23 increases greatly after the head 31 is formed, this is not true of the innermost portion of the shoulder for the reason that further expansion of the tubular body can rather easily occur to the extent necessary to fill the openings 12 and 13. Thus a combined action occurs as the shoulder 23 continues its movement, in that the outer portion of the shoulder moves or flows into the recess, while the innermost portion of the shoulder remains and causes expansion of the tubular body to that extent necessary to fill the openings 12 and 13. This means therefore that a smaller shoulder will remain for expanding the tubular body and this remaining shoulder is shown at 34 in Fig. 3. When this remaining shoulder completes its movement through the plates and completes the expansion of the tubular body to fill the openings 12 and 13, it moves into the counterbore 18 so that no appreciable expansion of the head 15 will occur. At this stage of the riveting operation the plates are tightly together and the openings 12 and 13 have been filled.

Continued movement of the pin moves the shank portion 28 through the tubular element and the diameter of this portion is sufficient to fill the tubular element fully so that the two parts of the rivet will be tightly connected through frictional engagement. If necessary, the shank portion 28 can wire-draw slightly to a smaller diameter as it is pulled into the tubular element and some wire-drawing of this character may occur in order to be sure that the shank will have a tight fit in the tubular element. In other words, the diameter of the shank portion 28 preferably will be large enough to normally require slight wire-drawing thereof or to obtain at least a good press fit as it moves into the tubular body.

Continued pulling of the pin finally brings the head 29 against the head 31 and then further movement of the pin becomes even more strongly resisted as the parts are drawn between the heads 29 and 15. When the pull on the pin increases sufficiently, it will break at the recess 27 and the parts are so related that this recess at that time will be substantially at the outer side of the head 15. The tight frictional fit between the shank portion 28 and the tubular element ordinarily will hold the two parts of the rivet in place so that a tight riveted connection is obtained.

The two parts of the rivet may be constructed from suitable aluminum alloys for instance, and the metal in the shoulder 23 should be of such hardness relative to the tubular element and of such dimensions that it will first form the head 31 and then bend or flow as mentioned, as the pin is pulled. Also it should be understood that the shank portion 28 will be of such hardness that it will wire-draw down slightly if necessary to allow its movement through that portion of the tubular element within the openings 12 and 13. It should be understood also that the pin should have sufficient tensile strength that it will not break at the recess 27 until the previous operations have been completed so as to prevent breaking of the pin before the rivet is properly set.

Although only one form of the invention has been illustrated and described in detail, it will be apparent to those skilled in the art that various modifications may be made without departing from the scope of the claim.

What I claim is:

A fastener for use in attaching together a plurality of members having aligned openings comprising a tubular element adapted to extend through the openings in the members and having a preformed head on one end for engaging one side of the adjacent member and having its other end adapted to be expanded into a head at the other side of the opposite member, a pin of ductile material extending through the element and beyond the preformed head so that the pin may be pulled in a direction outwardly from said head, the pin at its other end projecting beyond said other end of the tubular element and terminating in a head, said pin having an integral frusto-conical portion axially spaced from the head on the pin with the frusto-conical surface facing away from the head on the pin toward the direction of pull on the pin, the outside diameter of the frusto-conical portion being substantially the same as the outside diameter of the adjacent end of the tubular element, said pin adjacent the frusto-conical portion and between the frusto-conical portion and the head on the pin having a groove of reduced section as compared to the portion of the pin on the opposite side of the frusto-conical portion into which metal of the frusto-conical portion may flow as the pin is pulled, such metal of the frusto-conical portion collapsing into the space provided by the reduced section as the pin is pulled after the frusto-conical portion has first formed a head on the tubular element and thereafter passes through the tubular element to fill the openings a portion of the pin between the reduced section and the head of the pin following the frusto-conical portion into the tubular element and the length and diameter of the last named portion of the pin being such as to fill said openings and effect a tight fit between the pin and the tubular element.

OSCAR H. HOOD.

REFERENCES CITED

The following references are of record in the file of this patent:

UNITED STATES PATENTS

| Number | Name | Date |
| --- | --- | --- |
| 2,114,493 | Huck | Apr. 19, 1938 |
| 2,146,461 | Bettington | Feb. 7, 1939 |
| 2,372,222 | Mullgardt | Mar. 27, 1945 |

FOREIGN PATENTS

| Number | Country | Date |
| --- | --- | --- |
| 724,509 | France | Apr. 28, 1932 |